Aug. 2, 1955 — R. E. FREDERICKSON — 2,714,330
NAVIGATIONAL INDICATING AND POSITION PROJECTION INSTRUMENT
Filed Aug. 25, 1952

ROBERT E. FREDERICKSON
INVENTOR.

BY William W Haefliger

Aug. 2, 1955  R. E. FREDERICKSON  2,714,330
NAVIGATIONAL INDICATING AND POSITION PROJECTION INSTRUMENT
Filed Aug. 25, 1952  4 Sheets-Sheet 2
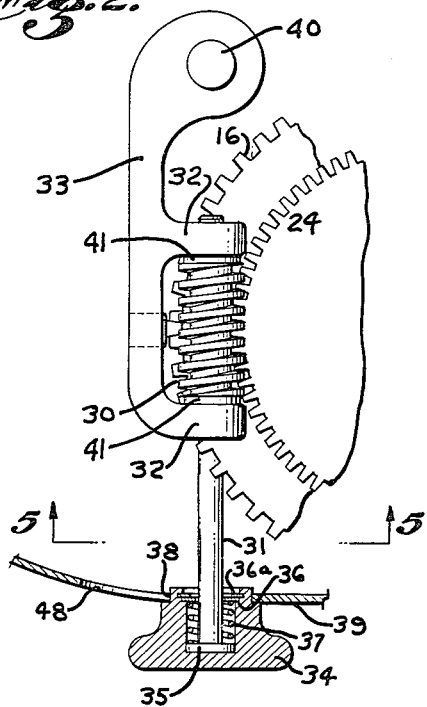
Fig. 2.
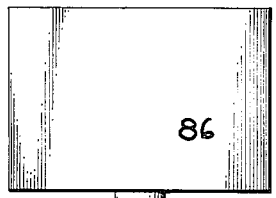
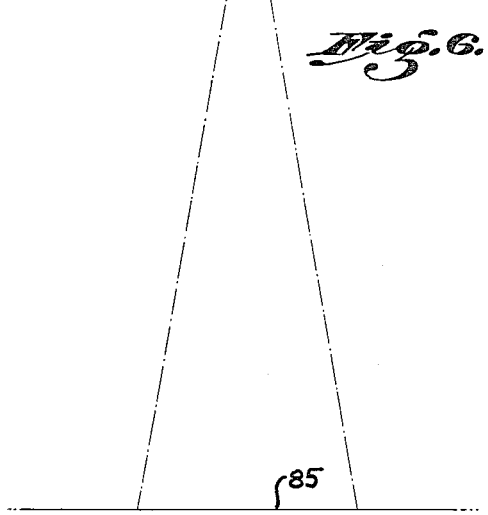
Fig. 6.
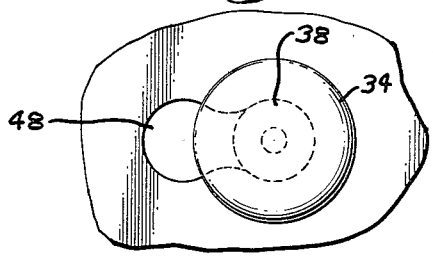
Fig. 4.
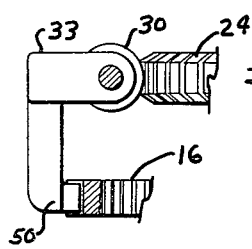
Fig. 5.
ROBERT E. FREDERICKSON
INVENTOR.
BY William W. Haefliger Aug. 2, 1955 R. E. FREDERICKSON 2,714,330
NAVIGATIONAL INDICATING AND POSITION PROJECTION INSTRUMENT
Filed Aug. 25, 1952 4 Sheets-Sheet 3
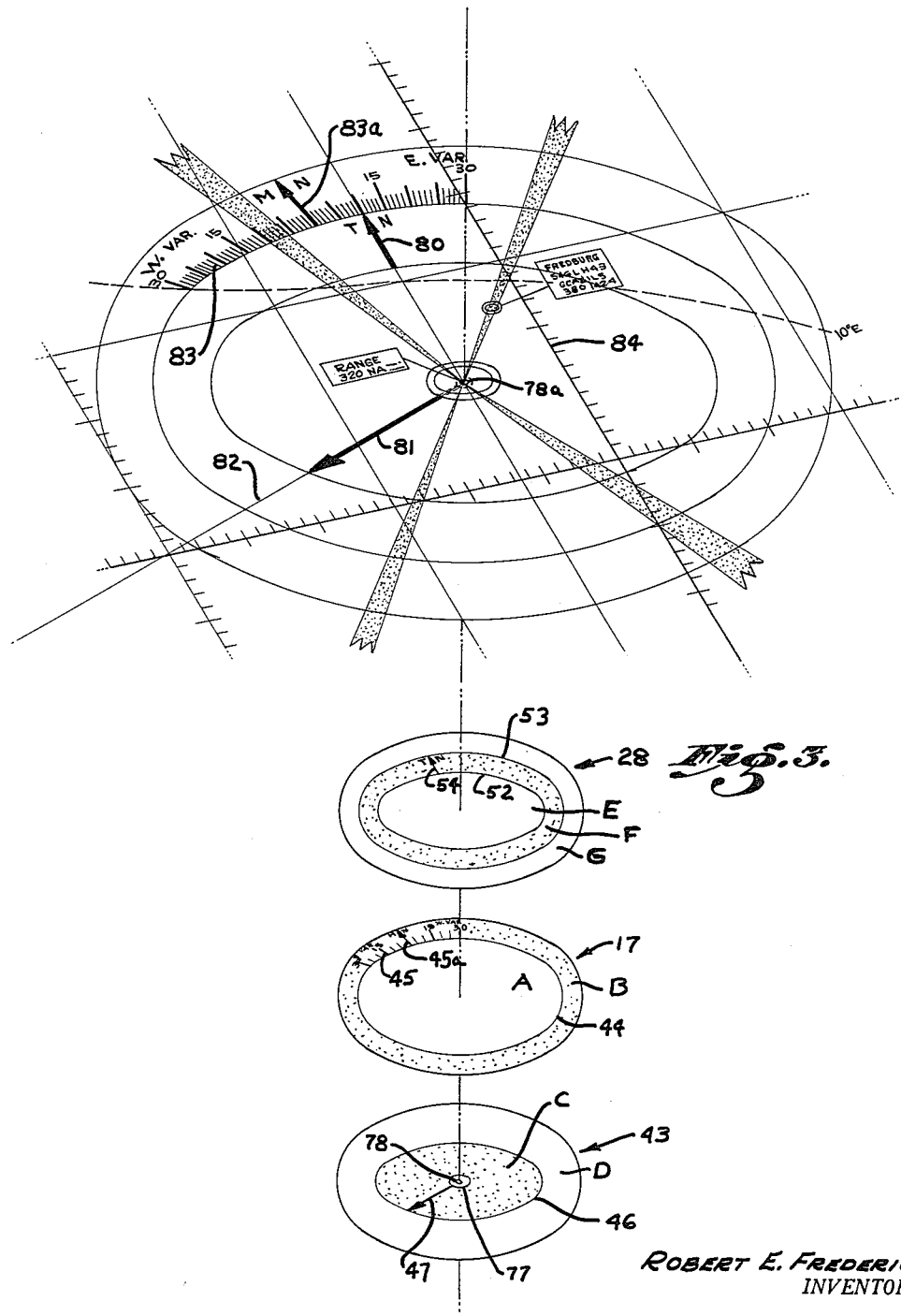

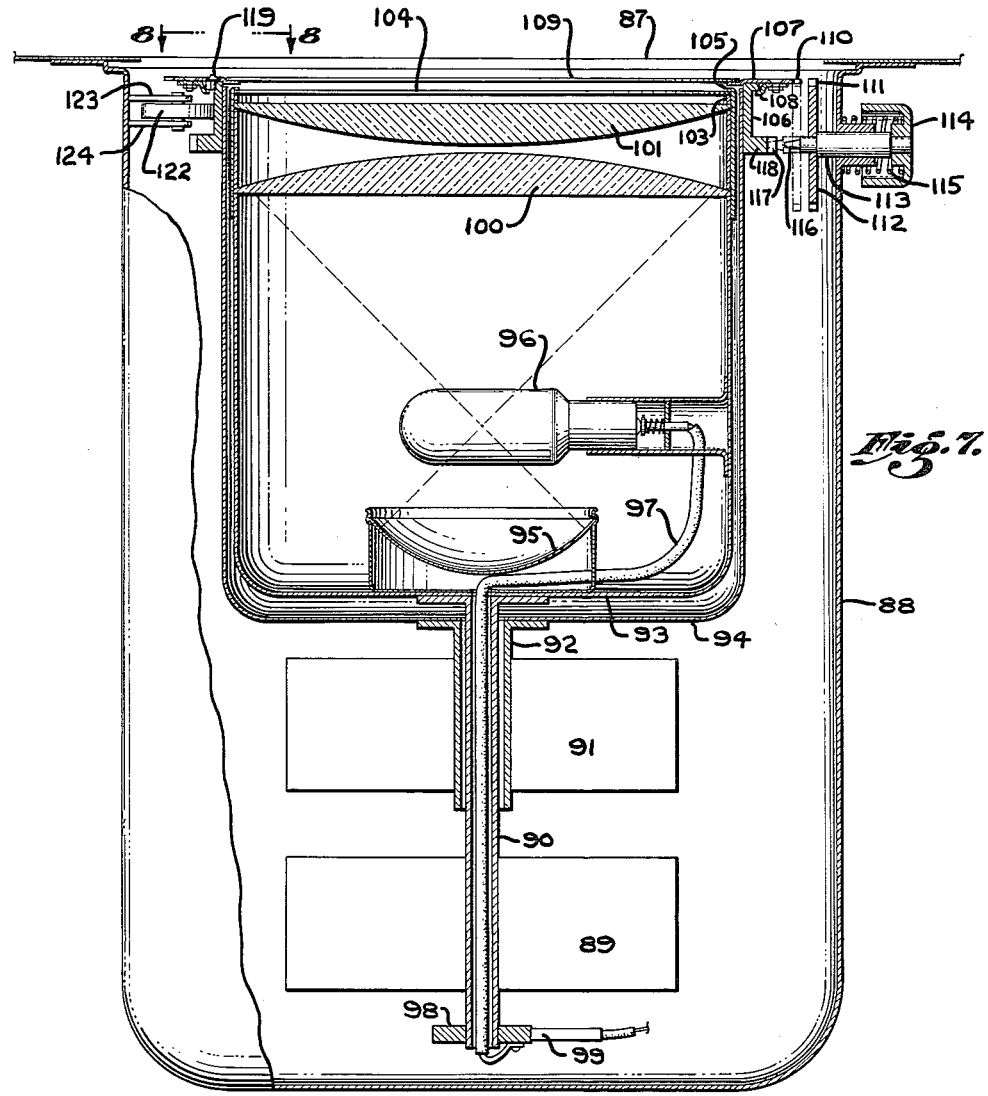
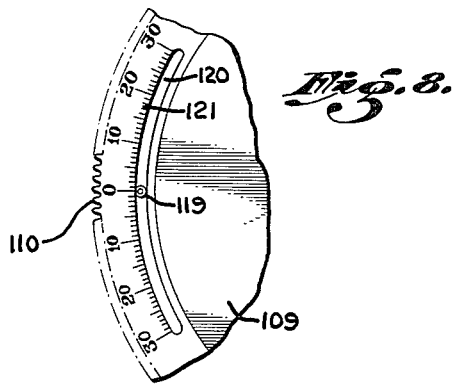

United States Patent Office 2,714,330
Patented Aug. 2, 1955

2,714,330

NAVIGATIONAL INDICATING AND POSITION PROJECTION INSTRUMENT

Robert E. Frederickson, South Gate, Calif.

Application August 25, 1952, Serial No. 306,231

7 Claims. (Cl. 88—24)

This invention relates to navigation indicating systems and instruments and more particularly to combined magnetic and radio compass responsive indicators wherein information concerning geographical position is projected in luminous form.

An object of the present invention is to provide a novel navigation indicating instrument comprising a simple and efficient automatic position indicator.

Another object of the invention is to provide a novel means for combining azimuthal intelligence received from one or more radio compasses and a magnetic north compass and for transmitting this information in luminous form.

Another object of this invention is to provide a novel method for determining geographical position upon a navigational chart which need not be drawn to a particular scale.

A still further object of the present invention is to provide a new type indicating mechanism possessing a minimum of moving parts which will rapidly and efficiently produce accurate luminous indications of geographical position.

The features of the invention will become more apparent in connection with the following detailed description of the illustrated embodiment thereof, together with the accompanying drawings wherein, Figure 1 is a cross sectional view of one form of the present invention illustrating in detail the various components thereof;

Figure 2 is a plan view taken along line 2—2 of Figure 1 and illustrating the reticle adjusting mechanism in detail;

Figure 3 is an oblique view of a navigational chart used in connection with the present invention, and of the three reticles forming a part of the invention illustrated in Figure 1;

Figure 4 is a view taken along line 4—4 in Figure 2 and comprises an end view of the adjusting means illustrated in Figure 2;

Figure 5 is a cross-sectional view taken along line 5—5 of Figure 2 and illustrates in detail the components of the adjusting mechanism;

Figure 6 is a schematic drawing of a form of the present invention showing the projecting mechanism located above the navigation table;

Figure 7 is a cross-sectional view of another form of the present invention;

Figure 8 is a plan view taken along line 8—8 of Figure 7 illustrating the azimuth indicating portion of the magnetic north reticle.

Figure 1:
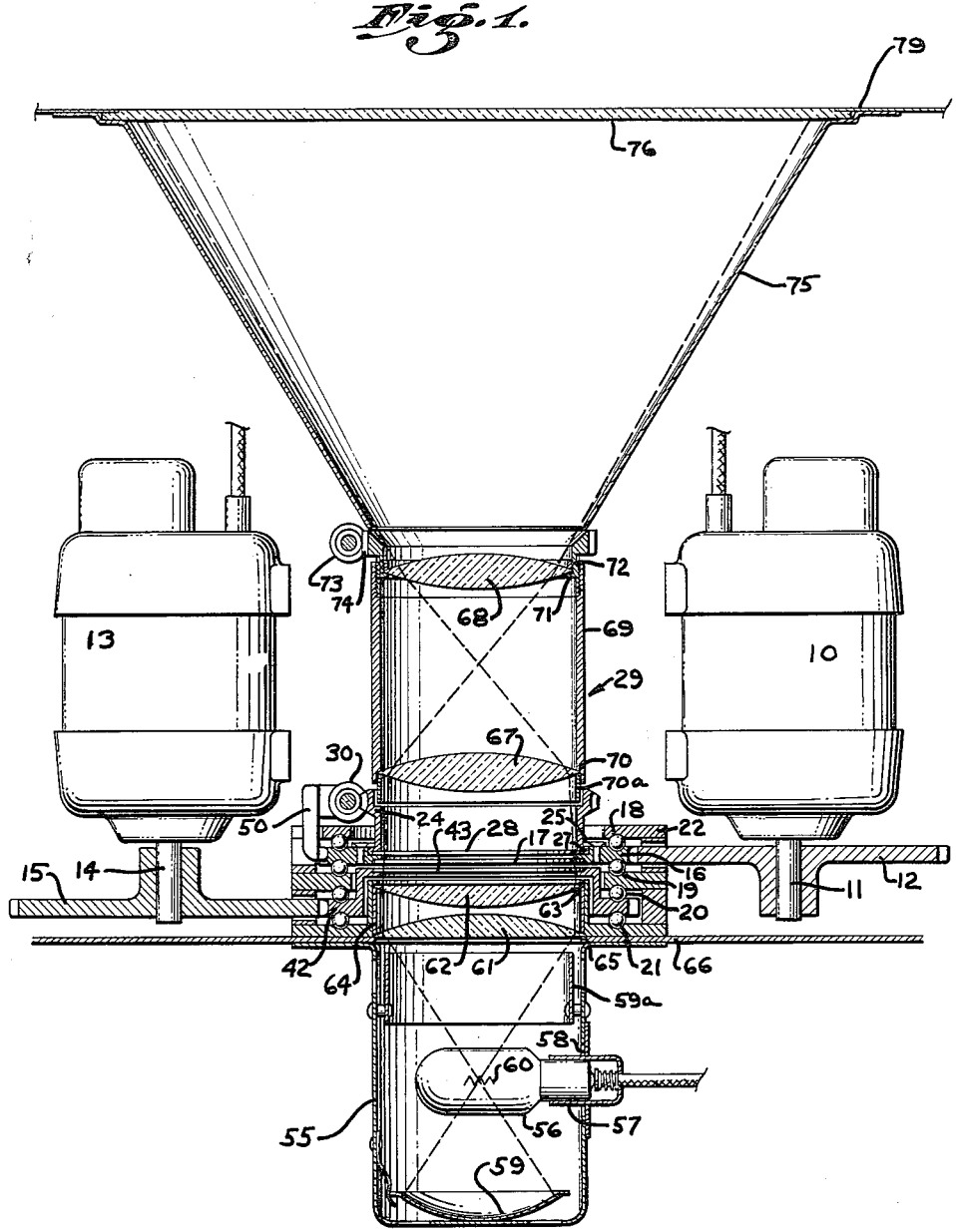

Referring now more particularly to the drawings, there is shown in Figure 1 a self synchronous electric motor 10, well known in the art as a selsyn, the rotor and shaft of which assume angular positions in accordance with the angular positions of the rotor and shaft of a remote selsyn, which is the master. In the present invention the angular position of the rotor of the remote selsyn is controlled by the movable element of a magnetic north indicating compass. Therefore, the shaft 11 of the selsyn 10 assumes an angular orientation which is governed by the angular position of the movable element or direction sensitive element of the magnetic north indicating compass. The remotely positioned compass will preferably be of the flux gate type which is well known in the art, and which is designed to mechanically compensate for compass error caused by local disturbing influences such as nearby ferro-magnetic materials.

Shaft 11, which lies substantially parallel to the axis of the projection system 29, has connected thereto at its lower extremity a gear 12 which engages an annular gear 16, the axis of which corresponds with the axis of the projection system 29. Gear 16 lies in a horizontal plane and is centered between bearing rings 18 and 19 as shown in Figure 1. These bearing rings are positioned between the upper and lower faces of gear 16 and internal faces of the housing 22, portions of which extend above and below the outer portions of gear 16 and are held together by bolts not shown. As will be seen in the drawings, gear 16 is annular in shape, there being permanently mounted thereon a disc shaped reticle 17 which is firmly attached to the inner diameter of the gear 16. Reticle 17 is known as the magnetic north indicating reticle and will be more particularly described in another portion of this specification.

Mounted on the upper surface of gear 16 by means of screws 26 is a retaining ring 25, the inner diameter of which overlaps and frictionally engages the outer diameter of the upper portion of a flanged portion 27 attached to a second reticle gear 24. Gear 24 has permanently mounted thereon reticle 28, known as the true north indicating reticle. The toothed portions of gear 24 are located immediately above the housing 22 and a worm 30 of an adjusting device engages these toothed portions.

The adjusting device comprises a worm 30 mounted on a shaft 31 which is journaled between forked arms 32 extending laterally from a swingable arm 33. Thrust washers 41 are interposed between worm 30 and the inner faces of forked arms 32. The opposite end of shaft 31 has mounted thereon a hexagonal head 35 which is slidably enclosed by hexagonally formed inner portion of knob 34. The inner portion of knob 34 has mounted therein a plate 36 which encircles the shaft 31 providing a sliding fit therewith. Snap ring 36a holds plate 36 in position within the knob 34. Between plates 35 and 36 is inserted a spring 37. As will be seen in Figures 2 and 4, knob 34 may be retracted outwardly from opening 38 in the housing 39, whereby the spring 37 will be compressed. The worm 30 may then be disengaged from gear 24 by rotating shaft 31 clockwise about pivot 40 until knob 34 springs into opening 48 in housing 39 in which position the worm 30 is retained out of engagement with gear 24. When the adjusting arm is swung out of adjusting position, reticle 28 will be angularly fixed with respect to reticle 17 due to the frictional overlapping relationship between retaining ring 25 and reticle gear flanged portion 27. In the adjusting position, with knob 34 positioned in opening 38 and worm 30 engaging gear 24, the finger 50 projecting downwardly from arm 33 engages the teeth of gear 16 so as to hold gear 16 and reticle 17 stationary while the angular position of gear 24 and reticle 28 is adjusted with respect to reticle 17 by turning knob 30.

The numeral 13 designates a second self synchronous motor, the shaft 14 of which rotates in accordance with the position of the rotor and shaft of another remote selsyn whose rotatable elements are controlled by the directional element of a radio compass. The radio compass, which is well known in the art, is controlled by the operator to assume an azimuthal orientation indicating the direction of a radio transmitter, the geographical position of which is known to the operator. The shaft 14 will automatically assume an angular position corresponding to the position of the directional element of the radio compass. Gear 15 is joined to the lower extremity of shaft 14 and engages annular reticle gear 42 which is mounted in the housing 22 below reticle gear 16. Bearing rings 20 and 21 are interposed between the upper and lower annular surfaces of reticle gear 42 and the annular portions of the housing 22, enabling gear 42 to rotate about the axis of the projection system 29. Attached to the inner diameter of gear 42 is a third reticle 43 known as the radio compass reticle, which will be described in another portion of this specification.

It will be seen that the angular position of the directional element of the radio compass governs the angular position of the radio compass reticle 43, which is rotatably mounted within the housing 22. Similarly the angular position of the direction sensitive element of the magnetic north compass governs the angular position of the magnetic compass reticle 17, which is rotatably mounted within the projection system 29. These angular relationships result from the fact that the pitch diameters of gears 15 and 42 are equal, and likewise the pitch diameters of gears 12 and 16 are equal. It will be understood that appropriate step-up and step-down gearing may be substituted for the gearing illustrated in Fig. 1 and the gearing connecting the movable elements of the radio and magnetic compasses with the master selsyns not shown so that similar angular relationships between the reticle positions and the positions of the movable elements of the compasses may be effected.

The numeral 17 in Figure 3 designates reticle 17 which is controlled by the magnetic compass. This reticle is disc shaped and divided into two concentric circular portions A and B at circle 44. Portion A is transparent, while portion B is opaque except for several radial indicating lines 45 lying on either side of magnetic north indicating line 45a, all of which lines are transparent. The reticle disc may be made of a clear plastic material, portion B of which may be darkened to opaqueness. The fine lines 45 and 45a may then be applied to portion B of the reticle by well known photographic processes, these processes being selected in order to attain a degree of line fineness consistent with the degree of image sharpness desired in projecting the line images onto transparent map plate 76. Lines 45 indicate one degree intervals of arc through thirty degrees on either side of magnetic north indicating line 45a.

The numeral 43 in Fig. 3 designates reticle 43 which is controlled by the radio compass directional element. This reticle is also disc shaped, preferably made of a clear plastic material, and divided in two concentric portions, C and D. The inner portion C is darkened to opaqueness, while the outer portion D is transparent. Circle 46 separates the opaque and transparent portions of the reticle, and the outer diameter of the reticle is co-extensive with the outer diameter of reticle 17. Photographically inscribed on inner portion C of reticle 43 are a fine radial indicating line 47, a small circle 77, and a center point 78, all of which are transparent. Reticle 43 and gear 42 are oriented in the housing so that line 47 points in a direction opposite to the direction of the transmitter the signals of which are being received by the radio compass.

The numeral 28 in Fig. 3 designates reticle 28, the adjustable true north indicating reticle. This reticle is also disc shaped, preferably made of a clear plastic material, and divided by circular lines 52 and 53 into concentric portions E, F, and G. Portion E is transparent, portion F is darkened to opaqueness, and portion G is also transparent. The outer diameter of reticle 28 is preferably made co-extensive with the outer diameters of reticles 17 and 43. A true-north radial indicating line 54 is photographically inscribed in the opaque portion F of the reticle, as shown in the illustration.

The transparent and opaque areas of the three reticles forming the reticle system are arranged so that circular line 46 on reticle 43 is diametrically co-extensive with circular line 52 on reticle 28. Similarly, circular line 44 on reticle 17 is diametrically co-extensive with circular line 53 on reticle 28. Thus, when the three reticles are aligned within housing 22 as hereinbefore described, their major axes will coincide and light rays projected parallel to the system axis will be interrupted by the opaque portions of the reticle system, with the exception of rays passing through the indicating lines 45, 45a, 54, 77, and 78, inscribed in the opaque portions of the reticles.

Lying beneath housing 22 and attached thereto is a lamp housing 55. An electric light bulb 56 mounted in socket 57 projects into the lamp housing 55 from an aperture 58 in the housing. A light reflector 59 is mounted beneath bulb 56 in the bottom portion of the lamp housing. Bulb 56 is of the projector type, having a focused filament 60, and light rays emanating therefrom are reflected upwardly to a pair of condensing lenses 61 and 62. The lenses 61 and 62 are spaced apart by spacer ring 64. An annular shoulder 63 forms an abutment against which the periphery of lens 62 is held, and shoulder 63 positions the lens 62 within housing 22. The periphery of lens 61 bears against a shoulder 65 formed by plate 66 to which the housing 22 is fastened by means of bolts, not shown.

Mounted above the reticle system and coaxially aligned therewith is a projection lens system comprising lenses 67 and 68, which are axially spaced within tube 69. Lens 67 is retained against shoulder 70 within tube 69 by means of threaded retaining ring 70a, and lens 68 is held against an annular shoulder of threaded ring 71 by means of threaded retaining ring 72. Ring 71 may be axially positioned within the upper threaded end of tube 69 by means of focus adjusting worm 73, which engages gear teeth 74 on ring 71.

Light rays reflected from the filament 60 by reflector 59 pass by tubular light shield 59a mounted in the upper portion of lamp housing 55 and are refracted by the condensing lenses 61 and 62 so as to emerge as parallel rays and impinge perpendicularly upon the reticle system. Certain of the parallel rays pass through those portions of the reticle system defined by the transparent indicating lines on the three reticles, and all other light rays are absorbed by the opaque portions of the three reticles. It is to be especially noted that the reticles are designed so that the transmission of light rays through the transparent indicating lines will not be interrupted when the angular positions of the reticles are changed with respect to one another. It will also be noted that the three reticles are mounted very close to one another so as to minimize adverse effects of light diffusion which tends to decrease the clarity of the projected images of the indicating lines. Light rays passing through indicating line 47, circular line 77, and point 78 of reticle 43 pass through transparent portions A and E of reticles 17 and 28. Light rays passing through transparent portion D of reticle 43 pass through indicating lines 45 and 45a of reticle 17 and pass through transparent portion G of reticle 28. Light rays passing through transparent portions D and A of reticles 43 and 17 pass through indicating lines 54 of reticle 28.

Parallel light rays comprising the transmitted images of the radial indicating lines 47, 45, 45a, 54, and the circular line 77 and center point 78 then impinge upon the projecting lens system 67 and 68, and are refracted thereby so as to be projected upwardly and outwardly within an angle defined by the conical metal shroud 75 forming the upper portion of the projection system, and supporting the transparent map plate or projection table 76.

The map plate 76 is joined to a navigation table 79 and forms therewith a flat working table upon which the navigator may lay a chart so as to determine his geographical position by means of the present invention.

As the navigator looks at his working table, he sees luminous indicating lines which are projected upon the under side of the map plate 76. When a chart is placed over the transparent map plate, the luminous indicating lines will illuminate the under side of the map, and provided the map is of the proper texture the luminous lines will be visible on the top surface of the chart or map, as shown in Figure 3. To sharpen the luminous images of the indicating lines, the focus adjusting worm 73 is rotated so as to adjust the axial position of the projecting lens 68 within the projection system 29.

The process of determining geographical position with the present invention is relatively simple and can be acomplished in a minimum of time and with very little effort. The navigator first notes the local magnetic variation from his dead reckoned position on the navigation chart. Next, he swings the adjusting arm 33 and worm 30 into engagement with gear 24 and while viewing the luminous images 83, 83a, and 80 of indicating lines 45, 45a, and 54 on the map plate 76, he proceeds to rotatably adjust the position of reticle 28 with respect to reticle 17, by turning knob 34. In doing this he adjusts reticle 28 so as to cause the projected image 80 of true north indicating line 54 to assume the local amount of magnetic variation from the luminous image 83a of magnetic north line 45a. The adjusting arm 33 is then swung away from gear 24 and knob 34 is permitted to seat in opening 48 in housing 39.

The navigator then places his chart over the map plate 76 so that the known map point position of a first radio transmitter whose signals are readily receivable coincides with the luminous point 78a which appears at the center of the map plate. The map or chart is then rotated about the luminous point center 78a until lines of longitude on the chart line up parallel with the luminous image 80 of the true north indicating line 54. It is of course understood that the luminous image 80 of the indicating lines will be readily seen by the navigator as he looks down on the chart. The navigator then adjusts the radio compass so that signals from the first radio transmitter are strongly received, and he then switches to the loop antenna which homes in on the station. On a distant station, the well known aural nul method may be used. When the signals from the station are most strongly received, the luminous line 81 which is the projected image of indicating line 47 will determine the first line of position 82, and the navigator then lays a straight edge along the luminous image 81 of the indicating line 47 and draws a first line of position 82 on the chart. Next, the navigator adjusts the radio compass so as to receive a signal from another transmitter whose position is known on the chart. He then adjusts his chart on the map plate 76 so that the known map point position of the second radio transmitter coincides with the luminous point 78a at the center of the table. The chart is again rotated about the center 78a to align the lines of longitude 84 with true north image line 80. When the signals from the second transmitter are most strongly received, the luminous image 81 will determine the second line of position, and the navigator draws this second line on the chart and extends it to intersect the first line of position on the chart. The point of intersection of the two lines of position determines the approximate location of the aircraft or vehicle in which the instrument is being used. The first line of position is then moved in the direction of travel according to the time and distance differential between the first and second lines of position. When this correction has been made, the point of intersection of the two lines of position indicates the location or "fix" of the vehicle. To check the accuracy of the "fix," another line of position may be run, utilizing signals from a third transmitter.

In Figure 6 there is illustrated in schematic form another form of the present invention in which the luminous images of the indicating lines are projected downward onto the surface of the chart on the navigator's table 85. The reticles, the selsyns driving the reticles, and the lens system are located within projection system 86 above the surface of the table 85. The advantage of this unit lies in the direct projection of the indicating images onto the working surface of the chart.

Still another form of the present novel navigation instrument is illustrated in Figure 7. A transparent map plate 87 is attached to the open end of an elongated housing 88 within which the indicating and projecting elements are mounted. The indicating reticles are positioned directly underneath the projection table so as to minimize diffusion of light passing upwardly through the transparent indicating lines on the reticles, and thereby to increase the clarity of the projected azimuthal images on the under side of the chart. The radio compass selsyn 89 is mounted within the lower end of the housing 88, and its rotor drives a tubular shaft 90. The magnetic north or compass selsyn 91 is mounted directly above selsyn 89 and its rotor drives a tubular shaft 92 which rotates freely about shaft 90. The upper end of shaft 90, which projects upwardly through shaft 92 is attached to the lower end of cup-shaped housing 93. Similarly, the upper end of shaft 92 is attached to cup-shaped housing 94 which is free to rotate about housing 93. A reflector 95 and focused filament electric light bulb 96 are both mounted within cup-shaped housing 93. The lamp cord 97 for light bulb 96 is led downwardly through tubular shaft 90, with the lower end of the wire being soldered to collector ring 98 which is attached to the lower end of shaft 90. A brush 99 makes electrical contact with the ring 98 as shown.

Condensing lenses 100 and 101 are positioned within the upper portion of cup-shaped housing 93 by means of spacer rings 102 and 103. A radio compass indicating reticle 104 is retained at the upper end of housing 93 by turned-over portions 105 of the housing. The outer surface of the upper end of housing 94 has fastened thereto a sleeve 106, and an annular plate 107 is frictionally clamped to the upper end of sleeve 106 by means of spring clamp 108. A true north indicating reticle 109 is attached to the annular plate 107 and lies directly beneath the map plate 87 and directly above reticle 104.

The outer diameter of annular plate 107 has gear teeth 110 formed thereon which may be engaged by teeth 111 of gear 112. Gear 112 is mounted on a shaft 113 which projects inwardly through housing 88. A knob 114 is attached to the end of the shaft 113 projecting outwardly from the housing 88 and a compression spring 115 extends between the housing 88 and the knob 114 so as to normally retain the knob a short distance from the housing. When the knob is pushed inwardly against the resisting force of spring 115, teeth 111 on gear 112 engage the teeth 110 on annular plate 107, and the inwardly projecting pointed end 116 of shaft 113 engages teeth 117 which are formed on the outer surface of flanged portion 118 of sleeve 106. The navigator may then adjust the angular position of plate 107 and reticle 109 with respect to the angular position of sleeve 106 by rotating knob 114. A marker 119 which is attached to sleeve 106 projects upwardly through a slot 120 in plate 107. A scale 121, graduated in degrees of azimuth, is formed on that portion of plate 107 adjacent to marker 119 and slot 120. It is evident that when the navigator rotates knob 114, he may adjust the angular position of plate 107 and reticle 109 with respect to marker 119, sleeve 106, and housing 94 thus enabling him to compensate for magnetic variation as was described in a preceding portion of this specification. It is also to be noted that additional structure is provided to prevent misalignment of the rotatable housings 93 and 94 when the end 116 of shaft 113 is pressed into engagement with teeth 117 on sleeve 106. Rollers 122 preferably mounted approximately 15 degrees apart are journaled between plates 123 and 124, which are mounted on the inside portion of housing 88 opposite from knob 114. There is normally a slight clearance between the contacting surfaces of the rollers 122 and the sleeve 106 so that housing 94 is free from frictional resistance to rotation which would otherwise be caused by the roller 122.

It will be understood that reticles 104 and 109 are similar in all respects to reticles 43 and 28 as described in connection with Figure 3, except that the opaque portions of reticle 104 will include both annular portions F and G of reticle 28. The scale 121 on annular plate 107 in the apparatus shown in Figure 7 replaces the reticle 17 shown in Figure 3, so as to simplify the mechanism. The apparatus of Figure 7 is further simplified through the elimination of the projecting lens 68 shown in Figure 1, and by the incorporation of light source 96 and reflector 95 within rotatable housing 93 so as to position it directly beneath the reticles 104 and 109. Furthermore, the complete navigation instrument as shown in Figure 7 is compactly designed by mounting the selsyns coaxially and enclosing the entire assembly within can-shaped housing 88. Clarity of projected images is provided for by mounting the reticles in close proximity to the transparent map plate 87. The use of the apparatus shown in Figure 7 is essentially the same as the use of the apparatus shown in Figure 1.

Changes may be made in the construction described above, and many different embodiments of this invention can be made without departing from the scope thereof as set forth in the claims appended hereto. It is intended that all matter described or shown shall be interpreted as illustrative and not in a limited sense.

I claim:

1. In a position indicating instrument: a set of rotatable indicating reticles; said set comprising at least one radio compass controllable reticle, a magnetic north indicating reticle, and a magnetic variation indicating reticle; adjustable means coupling said magnetic variation indicating reticle to said magnetic north sensitive reticle; each of said reticles being provided with concentric transparent and opaque portions; each opaque portion on any one reticle corresponding to axially spaced transparent portions on all other reticles of said set, said opaque portion carrying transparent indicating indicia; a transparent map-carrying plate disposed on one side of said set of reticles and spaced axially therefrom; and luminous means for illuminating said set of reticles and projecting luminous images of said transparent indicia onto said map plate, whereby said luminous images may be utilized to facilitate orientation of said map with respect to true north and determination of intersecting lines of position on said map with respect to radio transmitter locations.

2. In a position indicating instrument: a set of azimuth indicating reticles; said set comprising at least one radio compass controllable reticle, at least one magnetic north indicating reticle, and a magnetic variation indicating reticle; an adjustable coupling joining said magnetic north sensitive reticle and said magnetic variation indicating reticle; and adjusting means for adjusting the angular position of said magnetic north indicating reticle with respect to said magnetic variation indicating reticle; a transparent map carrying plate disposed on one side of said set of reticles and axially thereof; said reticles including indicia carrying opaque portions and transparent portions; and means to optically project onto said map plate luminous azimuth indicating images of said indica, whereby said images may be utilized to facilitate orientation of said map with respect to true north and determination of intersecting lines of position on said map with respect to radio transmitter locations.

3. An apparatus for projecting luminous azimuth indications upon a chart comprising: a light source; a pair of axially disposed condensing lenses; a projecting lens disposed in axial alignment with the axis of said condensing lenses; a transparent plate spaced upwardly from said projecting lens and disposed perpendicularly to the axis thereof, said plate comprising a map table; reticle means positioned between said projecting lens and condensing lenses to interrupt light rays from said condensing lenses; said reticle means including transparent and opaque portions, each opaque portion on any one reticle corresponding to axially spaced transparent portions on all other reticles, said opaque portions carrying transparent azimuth indicating indicia; and driving means connected with said reticle means for aligning indicia of one of said reticle means with respect to magnetic north and indicia of at least one other of said reticle means with the bearing of a radio transmitter, whereby luminous images of said aligned indicia may be projected onto a chart to determine position.

4. In a vehicle navigational instrument: a first rotatable housing and shaft combination, said housing enclosing a light source and carrying indicia bearing reticle means disposed perpendicularly to the axis of said shaft, said shaft being adapted to be rotated by coaxially disposed motor means operatively responsive to movement of a radio compass directional indicator; condensing lens means disposed between said light source and said reticle means; a second rotatable housing and shaft combination, said housing enclosing a portion of said first housing and being circumferentially spaced therefrom, said housing carrying second indicia bearing reticle means spaced closely adjacent said first reticle means, and said second shaft enclosing a portion of said first shaft and being adapted to be rotated by co-axially disposed motor means operatively responsive to movement of a magnetic compass directional indicator; and a rigidly supported transparent map table spaced closely adjacent and above said indicia bearing reticles, whereby luminous images of said indicia may be projected onto the underside of a map oriented on said map table to facilitate determination of geographical position with respect to radio transmitter locations.

5. The invention as set forth in claim 4 wherein said reticles include concentric transparent portions and indicia bearing opaque portions, the opaque portion of each reticle being radially co-extensive with the transparent portions of the other reticle.

6. The invention as set forth in claim 4 wherein said first shaft is adapted to be driven in rotation by co-axially disposed motor means responsive to a magnetic compass directional indicator, and said second shaft is adapted to be driven in rotation by co-axially disposed motor means responsive to a radio controlled directional indicator.

7. The invention as set forth in claim 4 including an annular member carrying said second reticle, said member being rotatably adjustable with respect to said second housing whereby said second reticle may be rotated to correct for local magnetic deviation from true north.

References Cited in the file of this patent

UNITED STATES PATENTS

| | | |
|---|---|---|
| 2,108,342 | Le Fevre | Feb. 15, 1938 |
| 2,323,337 | Lear | July 6, 1943 |
| 2,353,475 | Kinnard | July 11, 1944 |
| 2,364,731 | Luck | Dec. 12, 1944 |
| 2,421,077 | Miller | May 27, 1947 |
| 2,608,094 | Best | Aug. 26, 1952 |
| 2,637,848 | Cunningham | May 5, 1953 |